United States Patent [19]

Hummer et al.

[11] 4,300,159

[45] Nov. 10, 1981

[54] SCANNER

[76] Inventors: Robert A. Frosch, Administrator of the National Aeronautics and Space Administration, with respect to an invention of Robert F. Hummer; Deane T. Upton, both of Santa Barbara, Calif.

[21] Appl. No.: 578,700

[22] Filed: May 19, 1975

Related U.S. Application Data

[63] Continuation of Ser. No. 583,219, Sep. 30, 1966, abandoned.

[51] Int. Cl.³ .................. H04N 1/04; H04N 3/02; H04N 5/30
[52] U.S. Cl. .................. 358/109; 250/235; 250/236
[58] Field of Search .......... 178/6, 6.8, 7.1, 7.2, 178/7.7, 7.6, DIG. 27; 358/87, 109; 250/235, 236

[56] References Cited

U.S. PATENT DOCUMENTS

| | | | |
|---|---|---|---|
| 2,099,872 | 11/1937 | Stern | 178/7.6 |
| 2,157,468 | 5/1939 | Walton | 178/7.6 |
| 2,222,937 | 11/1940 | Dimmick | 178/7.6 |
| 2,905,758 | 9/1959 | Walker | 358/87 |
| 2,989,643 | 6/1961 | Scanlon | 178/7.6 |
| 3,164,838 | 1/1965 | Heinrich | 354/94 X |
| 3,223,777 | 12/1965 | Crawford et al. | 178/6.8 |
| 3,258,595 | 6/1966 | Galante | 178/DIG. 38 |

OTHER PUBLICATIONS

Hanel et al., "Tracking Earth's Weather with Cloud Cover Satellites"—Electronics, May 1, 1959, pp. 44-49.
Stampfl et al., —Journal of the SMPTE, vol. 73, Feb. 1964—pp. 130-134.

*Primary Examiner*—S. C. Buczinski
*Attorney, Agent, or Firm*—Robert F. Kempf; John R. Manning; Robert D. Marchant

[57] ABSTRACT

An aerial vehicle rotating in gyroscopic fashion about one of its axes having an optical system operative to scan an area below the vehicle in determined relation to vehicle rotation. A sensing device is provided to sense the physical condition of the area of scan and optical means are associated therewith to direct the physical intelligence received from the scan area to the sensing means. Means are provided to incrementally move the optical means through a series of steps to effect sequential line scan of the area being viewed keyed to the rotational rate of the vehicle.

1 Claim, 11 Drawing Figures

SCANNER

ORIGIN OF INVENTION

The invention described herein was made in the performance of work under a NASA contract and is subject to the provisions of section 305 of the National Aeronautics and Space Act of 1958, public law 85-568 (72 Stat. 435; 42 USC 2457).

This is a continuation of application Ser. No. 583,219, filed Sept. 30, 1966, now abandoned.

The invention relates to a camera arrangement particularly adapted for use in a synchronous satellite to provide earth or sky scan and photographs thereof.

In recent years low or medium altitude weather satellites have been used to literally take thousands of pictures of the earth's surface and its cloud cover. While these photographs have had many uses, they are particularly useful for long term weather forecasting. Certain shortcomings are patent with the satellites used to date. They have a limited range of view and do not provide necessary data over continuous long periods of time. Hence, information is incomplete. Optimum results require that the earth area viewed be as large as possible and that the time of view be as long as possible to see weather pattern growth, determine motion thereof, and illustrate local and rapid weather development disturbances. The deficiencies of the low and medium altitude weather satellites have led to a proposal that the most desirable end results may be obtained by positioning a satellite in synchronous orbit above the earth.

Proposals to date have indicated a satellite at synchronous altitude should have a stable platform from which time exposures or other photographs of the earth could be taken. However, to maintain satellite stability, it is necessary that the satellite spin on its axis and thereby use a gyroscopic effect to maintain space orientation. The multiple requirement of a spinning body and a stable platform had led to many complex despinning plans or other motion compensation schemes.

The present invention departs from prior art concepts in that it makes use of satellite spin to provide a photographic constant latitude line scan. When placed in orbit, the satellite is oriented so that its spin axis is parallel to the axis of rotation of the earth. In such a stationary synchronous position above the earth, earth motion is effectively cancelled out and does not in any way affect the photographic process.

While the invention as herein described will primarily refer to an arrangement utilizing satellite spin to provide earth area scan, it will be understood that with proper control it may likewise be used to provide scan photographing of any area of extraterrestrial space.

A primary object of the invention is to provide an arrangement for use in a spinning synchronous satellite that utilizes satellite spin to provide line scan of a determined area.

It is a further object of the invention to provide a camera arrangement which utilizes satellite spin to provide area scan wherein means are provided to controllably step the optical viewing axis through a determined arc.

It is a particular object of the invention to provide a camera arrangement adapted to utilize satellite spin and wherein the optical or telescopic system is pivotally mounted within the craft and is operatively connected to a power stepping unit whereby the optical axis may be moved through a determined arc in correlation with satellite rotation.

It is yet another object of the invention to provide power train transmission connection that avoids motion loss and thereby provides high quality picture resolution and accurate repeatability.

Still another object of the invention is to provide a camera arrangement which utilizes a conventional electromagnetic wave detector wherein the detector is always in line with the camera optical axis in all camera positions with resulting excellent imagery and high resolution.

These and other objects and features of the invention will become apparent in the course of the following description and from an examination of the related drawings, wherein:

FIG. 6 is a detailed fragmentary view of the camera driving structure taken along line 6—6 of FIG. 5a;

Figure 1:
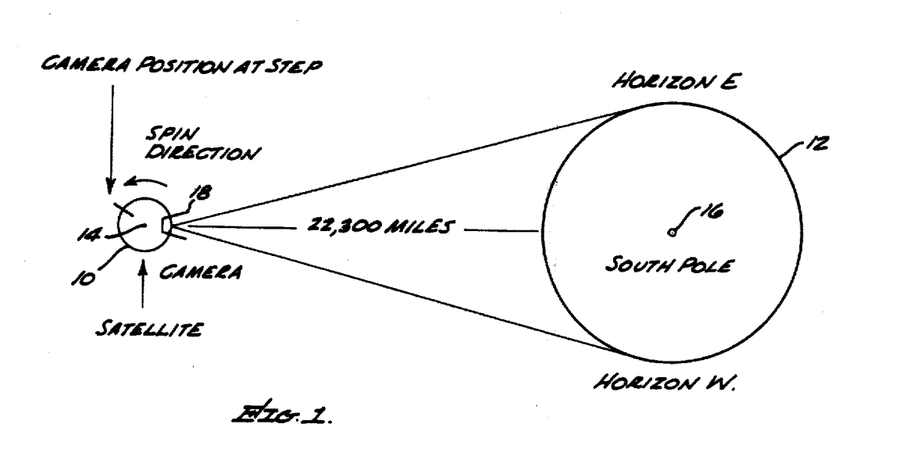
FIG. 1 is a schematic view illustrating a principle of operation of the disclosed structure.
Figure 2:
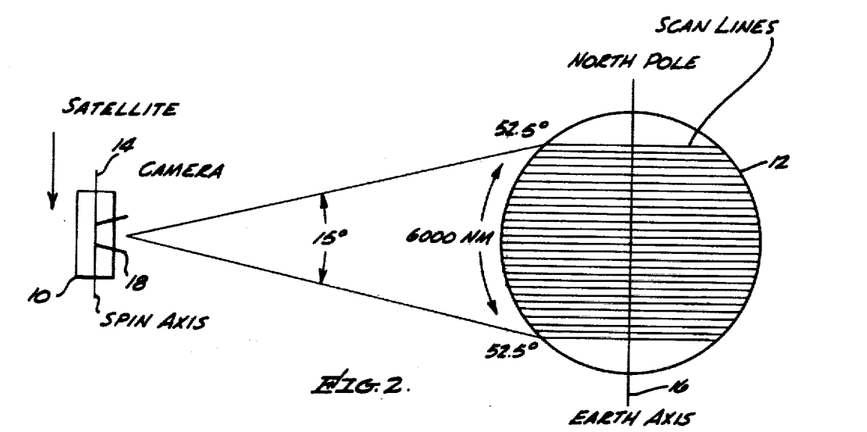
FIG. 2 is another view similar to FIG. 1 and taken in a plane 90° relative thereto.

In a preferred embodiment of the invention, it is proposed that a synchronous spinning satellite, indicated at 10 in FIGS. 1 and 2, be placed in a synchronous orbit above the earth. This may be achieved by physically locating the satellite approximately 22,300 statute miles above the earth's surface. In FIGS. 1 and 2 the earth is designated by the numeral 12.

The spin axis of the satellite is shown at 14 in both FIGS. 1 and 2 and the earth's rotational axis is shown at 16. In this position and assuming that the satellite is spinning at 100 revolutions per minute, satellite motion and earth motion are cancelled out and do not affect the photographic process. The satellite 10 carries a camera 18 which rotates therewith and during a portion of that rotation views the earth from horizon west to horizon east as is shown in FIG. 1. Assuming a 15° field of view in the north-south direction as shown in FIG. 2, it will be seen that the camera 18 has a capability of viewing the earth from a line at 52.5° south latitude to a line at 52.5° north latitude. As the camera points directly out of the satellite at right angles to the satellite axis, it will be apparent that it will scan the earth parallel to the equator. With the particular dimensions as hereinafter described, the preferred embodiment of the invention at the equator will scan a line from horizon west to horizon east approximately 2.2 statute miles wide. As hereinafter described, the invention proposes to controllably move the optical axis of the camera so that after each west-east scan that optical axis may be directed above or below the equator in continuous incremental steps so that a plurality of line scans approximately 2.2 statute miles wide are made during a complete stepping cycle from the noted north to south latitudes, or vice versa. In one embodiment of the invention and with the satellite rotating at 100 revolutions per minute, the optical axis of the camera scans 100 horizontal lines each minute which requires approximately twenty minutes to scan a 2000 line picture between the noted north and south latitudes. Upon completing the scanning cycle, appropriate control is provided to return the optical axis to its original trace position in a relatively short period of time so that a new scanning cycle may be accomplished.

Figure 3:
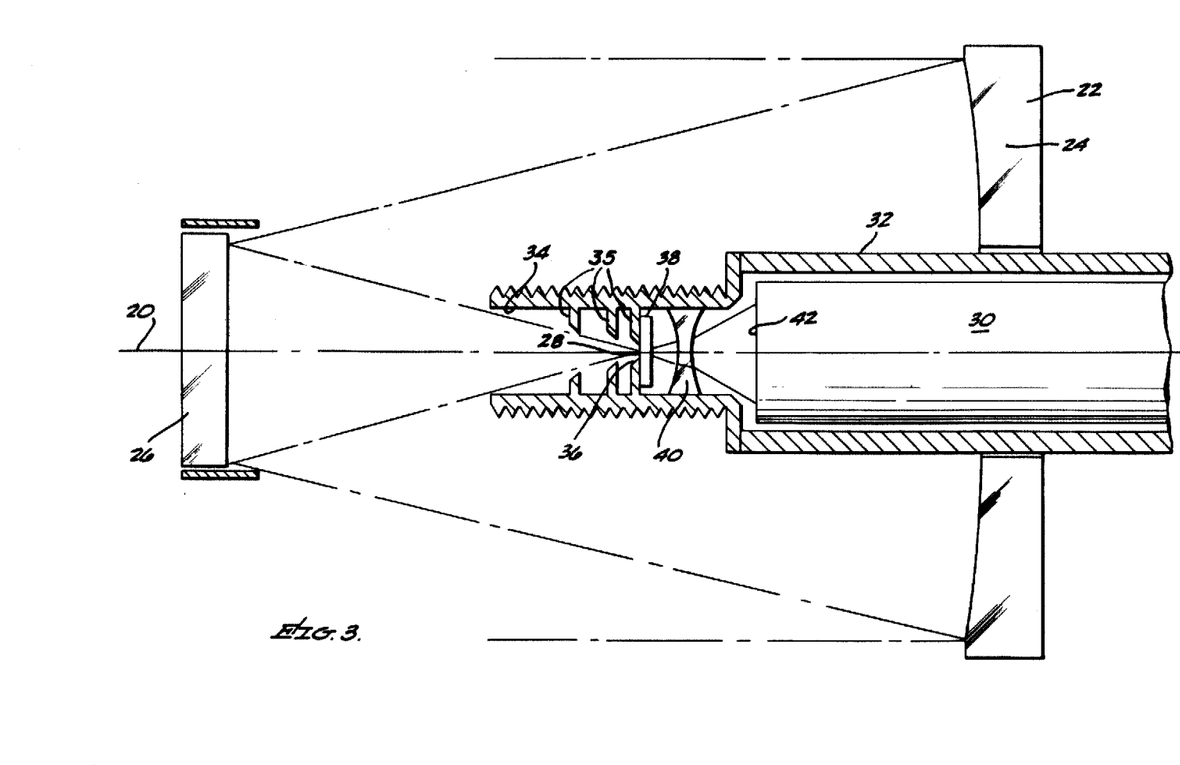
FIG. 3 is a fragmentary partially schematic elevational view illustrating a preferred telescope system which may be employed in the invention.

FIG. 3 is fragmentary partially schematic illustration of a preferred optical arrangement which may be used in the camera. The optical axis is indicated by the numeral 20. The optical system shown is known in the art as a Cassegrain-type reflecting telescope. Specifically, it comprises a primary mirror 22 which views the area seen by the telescope. The primary mirror 22 has a parabolic reflecting surface 24 which reflects the received image to a secondary plane mirror 26, the latter focusing the reflected waves to a focal point at 28. A photomultiplier tube 30 is provided to receive the reflected waves and provide an output signal responsive to wave intensity. The tube 30 is contained in a housing 32, the latter defining a chamber 34 at its forward aspect which carries a plate having a minute wave receiving aperture 36 at the focal point 28. If desired, a filter 38 may be provided to eliminate undesired radiant wavelengths. A diverging lens 40 is in optical series behind the aperture 36 and expands the received waves thereby allowing them to impinge on the wave-sensitive surface 42 of the multiplier 30. Depending upon the wavelengths being sensed, the surface 42 may be provided with appropriate detecting devices. Where visible light waves are involved, an appropriate cathode sensitive to light is sufficient. Since the devices which may be utilized do not form a part of the disclosed invention, they will not be described in detail. Baffles 35 serve to trap scattered light waves and minimize their effect on recording the viewed scene.

Figure 4:
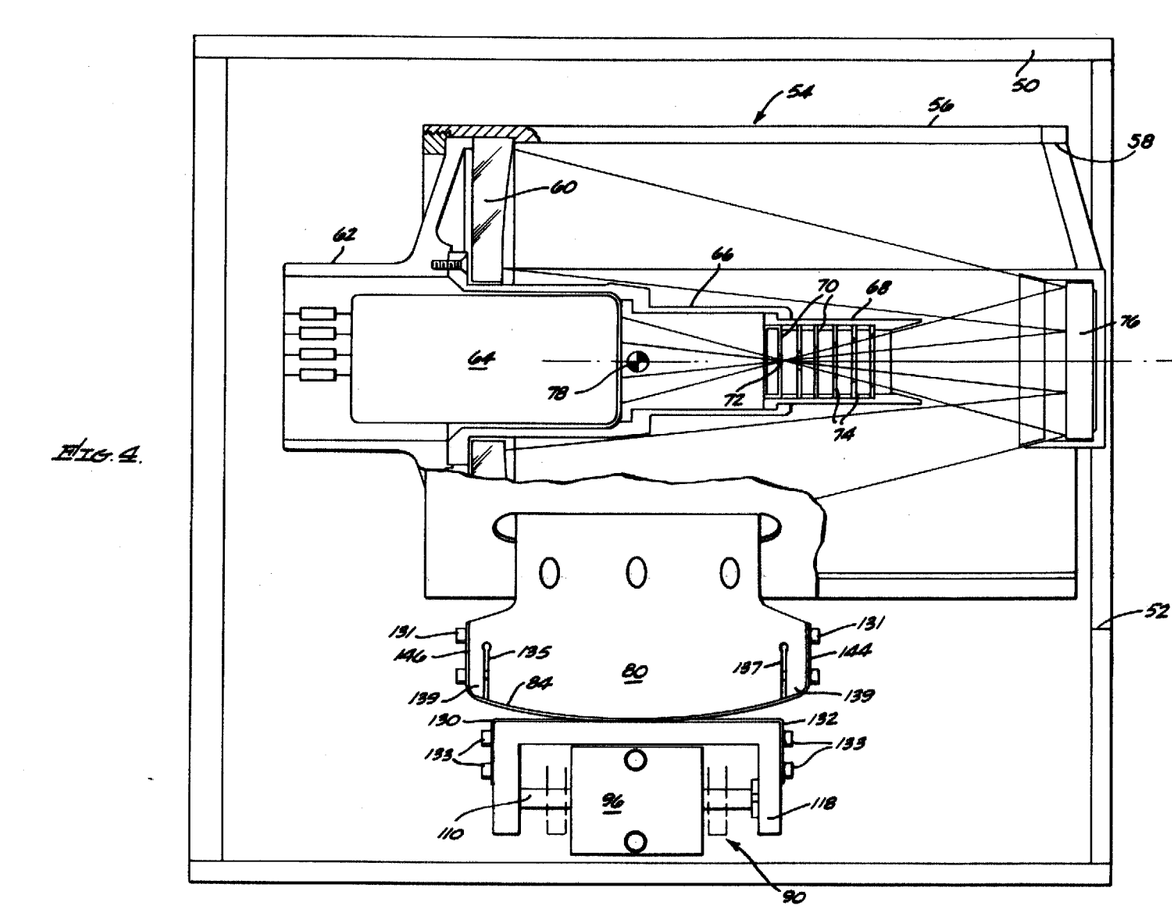
FIG. 4 is a side-elevational view, partially fragmentary, of a preferred embodiment of the camera arrangement.
Figure 5:
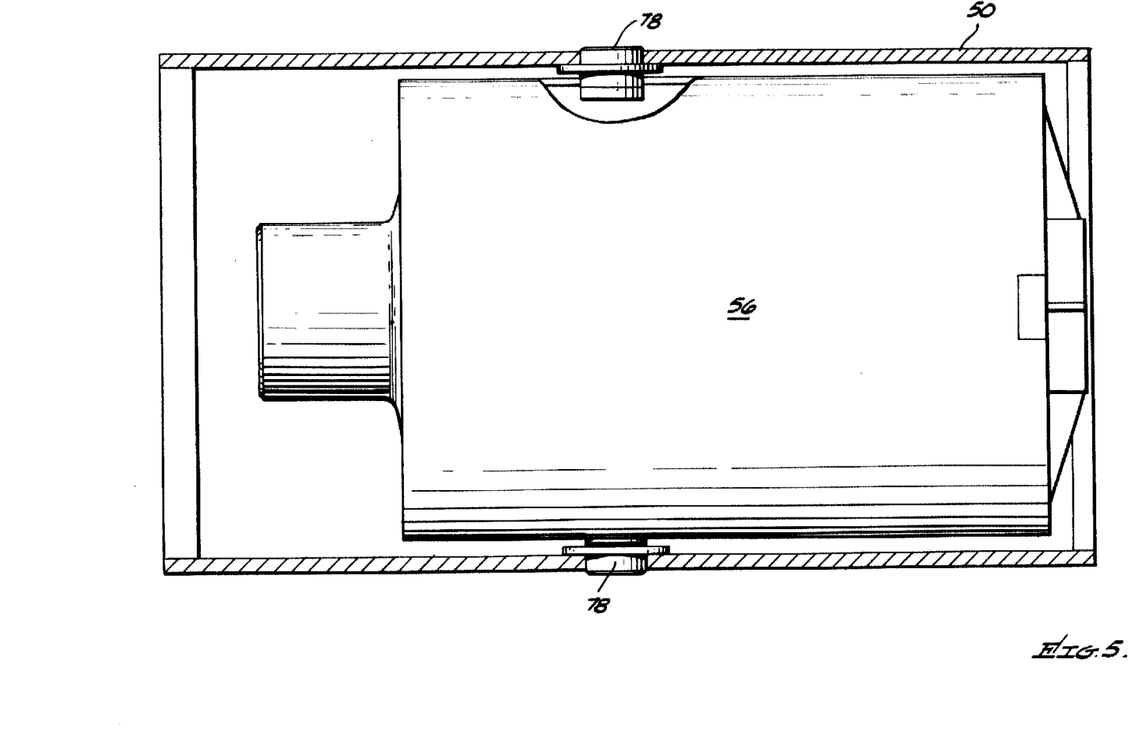
FIG. 5 is a top plan view of the structure shown in FIG. 4.

Directing attention to FIGS. 4–5, a housing 50 is provided which is preferably a rectangular black box adapted to be secured to a spacecraft in any conventional manner. The housing 50 has an opening, as at 52, and a telescope indicated generally at 54 is appropriately disposed therein and directed toward the opening 52. The telescope 54 comprises a cylindrical container 56 having an open end 58 at one terminal aspect thereof. An elongated cylindrical container 62 is at the left-hand aspect of the cylinder 56 and houses a conventional light-sensitive photomultiplier device 64. The cylinder 62 is provided with diminished diameter segments 66 and 68 forwardly of the device 64. A fixedly mounted annular element 70 is provided with a light-receiving pinhole 72 centrally located therein. The surface of element 70 is preferably highly light reflective and in one embodiment the pinhole 72 may be approximately 0.001″ in diameter. The reduced diameter segment 68 carries a plurality of centrally apertured annular light baffles 74, 74, which trap and reflect scattered light waves that may be received whereby the scattered waves do not affect the focused light from the area being photographed.

Figures 5A, 9:
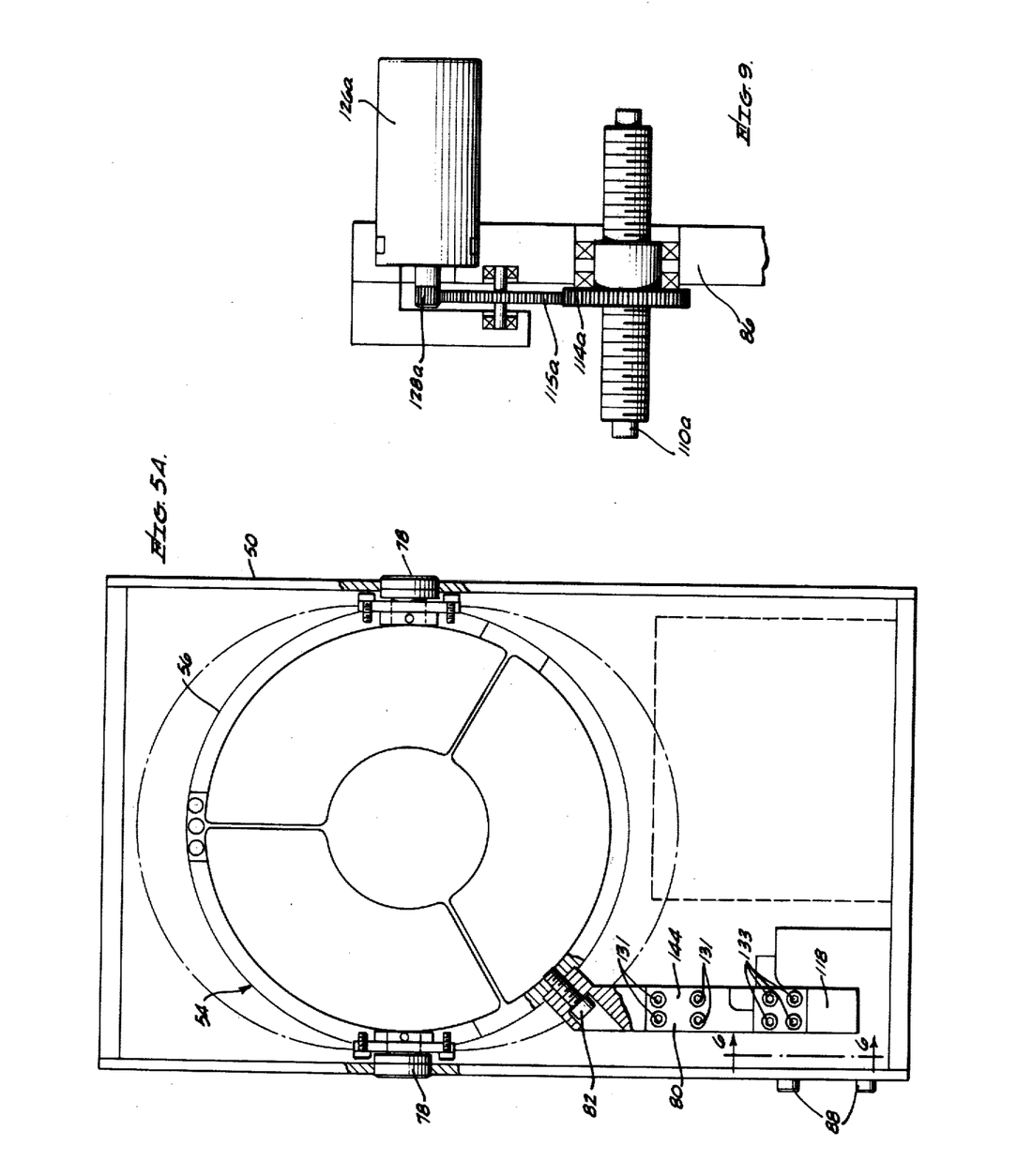
FIG. 5a is a front-elevational view taken from the right of the structure of FIG. 4.
FIG. 9 is a schematic view illustrating the operation of the camera stepping mechanism.

In operation, the viewed scene is reflected from parabolic mirror 60 to plane mirror 76, the latter converging the reflected waves to a focal point at the pinhole 72. Passing through the pinhole 72 the light waves diverge and cover the entire sensitive surface of photomultiplier device 64. The diverging of the light waves to cover the entire surface of the photomultiplier device 64 is beneficial in that concentrated or focused light as, for example, when the device views the sun, is not impinged on the light-sensitive surface of the device 64 which would have the effect of vaporizing and destroying same. The cylinder 56 is carried by opposed walls of the rectangular box 50 by aligned pivots 78, 78, as shown in FIGS. 5 and 5a. In the lower left-hand quadrant of the cylinder 56, as seen in FIG. 5a, a depending drive-plate 80 is secured thereto via conventional cap screws 82. The drive-plate 80 is provided with a downwardly-facing arcuate surface 84 as seen in FIG. 4. Pivot 78 is the radius center for arc 84.

Figure 6:
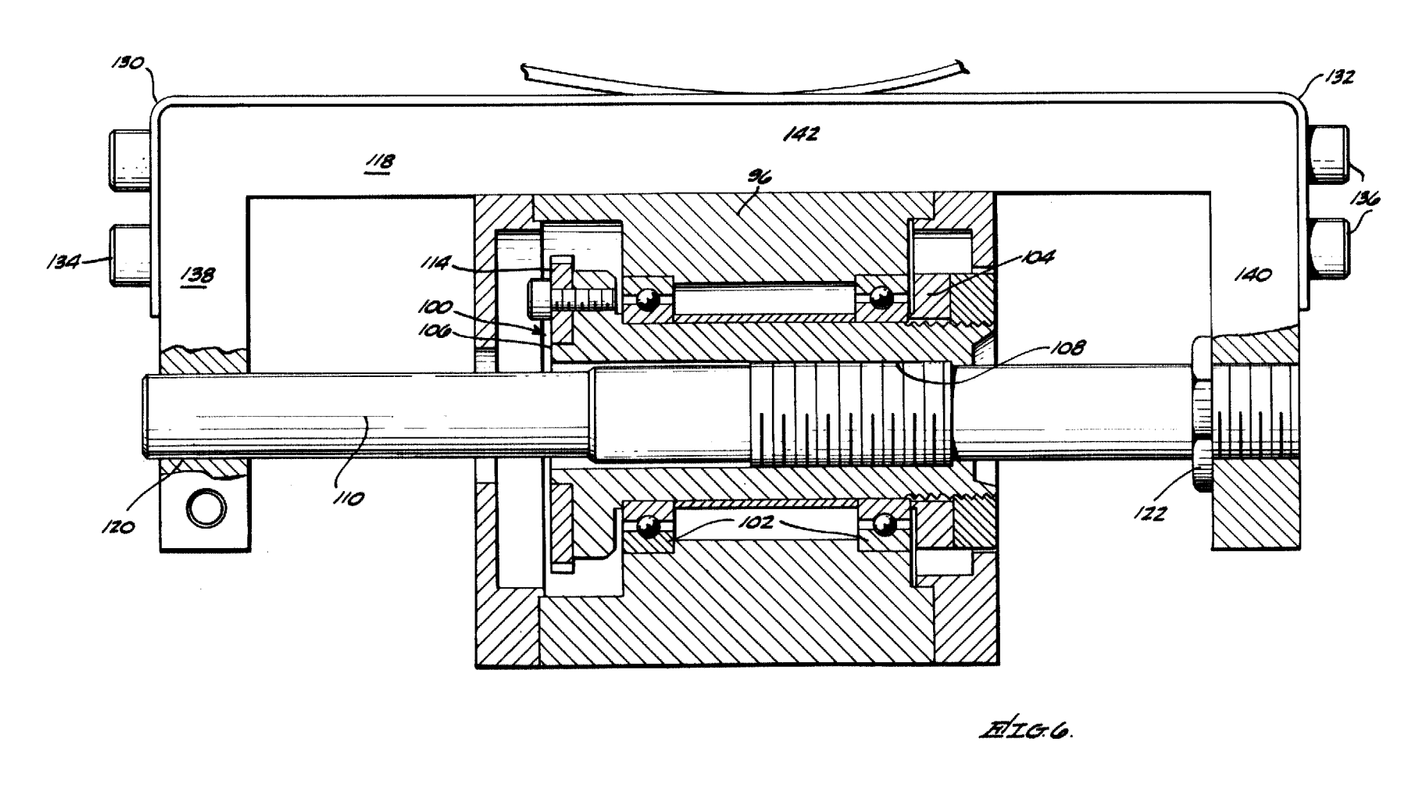
Figure 7:
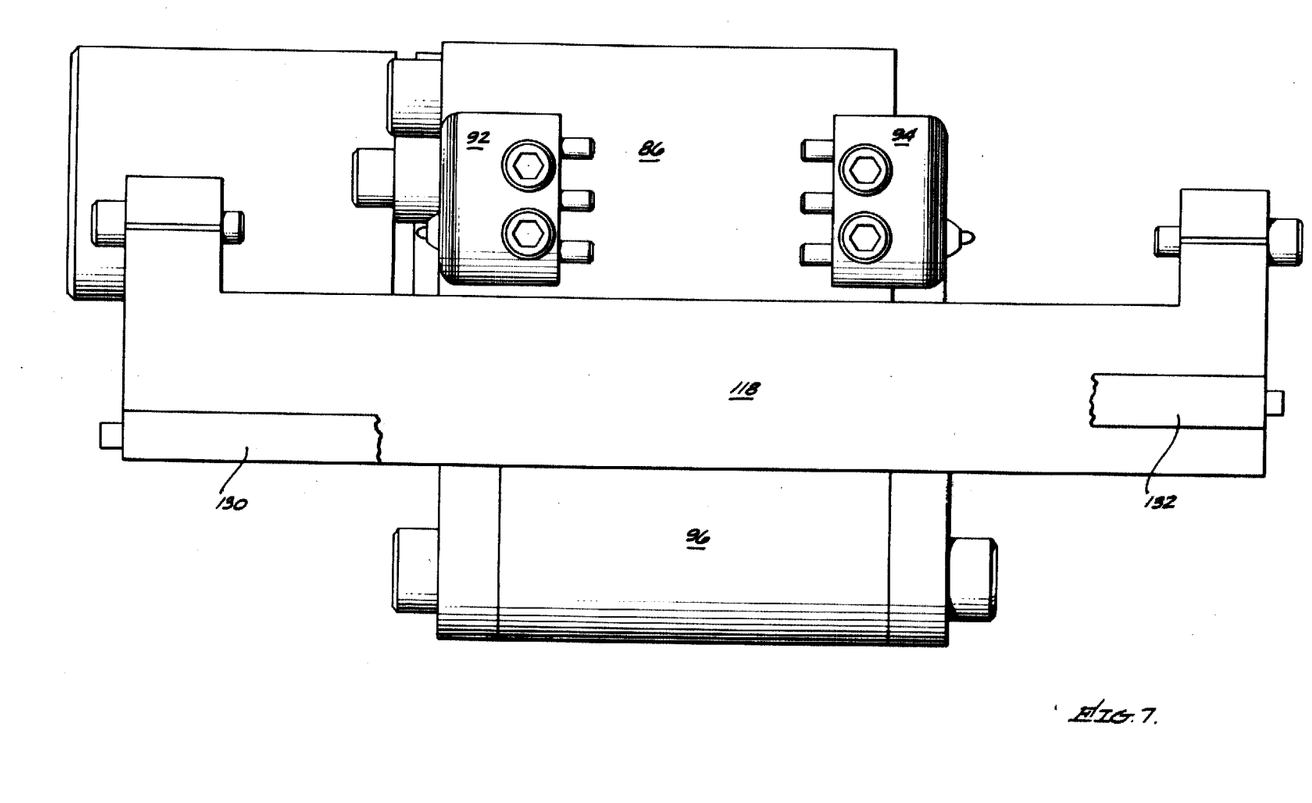
FIG. 7 is a top plan view of the structure shown in FIG. 6.
Figure 8:
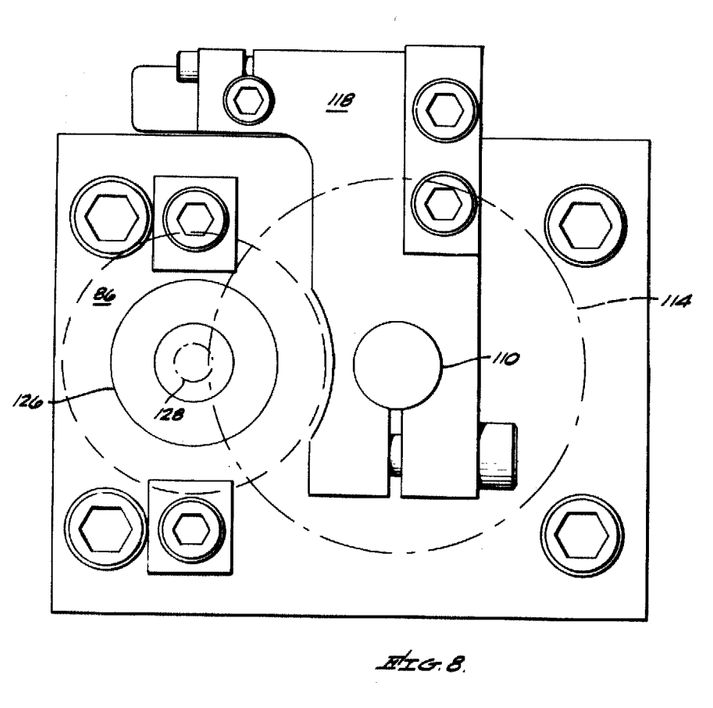
FIG. 8 is a left-hand end view of the structure shown in FIG. 6.

A supporting block 86 is carried by the box 50 via cap screw 88, 88, immediately below the arcuate surface 84. A camera drive arrangement is indicated fragmentarily and generally at 90 in FIG. 4 and maybe more fully described by reference to FIGS. 6–8, inclusive. The fixed block 86 is shown in FIG. 7 and has mounted thereon opposed upper and lower limit switches 92 and 94, respectively, the block 86 has a forwardly projecting boss 96, the latter having a cylindrical aperture 98 extending therethrough. A power train arrangement indicated generally at 100 is disposed in cylindrical aperture 98 for rotation therein about bearings 102, 102. A locknut 104 captures the arrangement within aperture 98.

Driving element 106 is centrally apertured and threaded as at 108 to receive lead screw 110, the latter threadably engaging the drive element at 108. The drive element 106 has driven gear 114 bolted thereto and directed radially outwardly. Element 106 may be called a lead screw nut. The screw 110 is conventionally affixed to a ram 118 at opposed ends of the bar as at 120 and 122. The ram 118 is therefore free to move with the screw 110 relative to the block 86 and its connected housing 50. Rotation of lead screw nut, of course, causes such motion.

The block 86 carries a stepping drive motor 126 (FIG. 8) which has a driving pinion gear 128 secured to its rotating armature shaft. The gear 128 meshes with driven gear 114 carried by element 106 as shown in FIG. 6. It will thus be apparent that upon rotation of the driving motor 126, gear 114 is rotated which in turn drives screw 110 laterally, thus inducing linear movement of ram 118. The motor 126 is reversible as will hereafter appear and thus the ram 118 may be moved to the left or right as seen in FIGS. 4 and 6, depending upon motor rotation direction.

The ram 118 carries a plurality of metal bands 130 and 132 which are affixed thereto via cap screws 134 and 136 at depending lugs 138 and 140 of said ram 118. As seen in FIG. 7, the strips 130 and 132 overlie the upper wall 142 of the ram 118 and are essentially parallel to each other in this view. As shown in FIG. 4, the metal band 130 has its opposite end secured to depending drive plate 80 as at 144 while the band or strip 132 has its opposed ends secured to drive plate 80 as at 146. The bands 130 and 132 thus partially overlie the arcuate surface 84 and provide a driving connection between the plate 80 and the ram 118 via cap screws 131 and 133. Plate 80 may be slotted as at 135 and 137 to provide cantilever spring sections 139 and 139. Cap screws 141, 141, may thus spring sections 139 and thus tension bands 130 and 132. The construction thus described is desirable in a preferred embodiment of the invention in that a tight mechanical linkage is provided between the plate 80 and ram 118 which virtually eliminates any backlash or motion transfer loss during the operation of the device is hereinafter described. It should be noted that with an appropriate gear ratio between the drive pinion 128 the driven gear 114 and by using an extremely fine pitch thread at 108, a large mechanical advantage transmission ratio may be obtained which provides accurate movement of the plate 80 and connected telescope 54 in extremely small increments. Additionally, a low power input is required. As will appear, therefore, resolution and repeatability of the camera is thus enhanced.

The fragmentary and modified embodiment of the precision drive mechanism described with reference to FIGS. 4-8 is schematically illustrated in FIG. 9. Here the power transfer between the motor 126a to the lead screw 110a via pinion 128a, gear 114a, and an idler gear 115a, is clearly shown. Illustrative of the fine increments of motion that may be achieved, it may be assumed there is a 10.1:1 reduction between the pinion 128a and gear 114a. The lead screw 110a is provided with a pitch that will accommodate a 0.024" linear travel per revolution. Therefore, one revolution of the motor 126a will induce a 0.0024" linear motion in screw 110a. Similarly, if the motor 126 is pulsed in 90° rotational increments, a 0.0006" linear travel will result in screw 110a.

Figure 10:
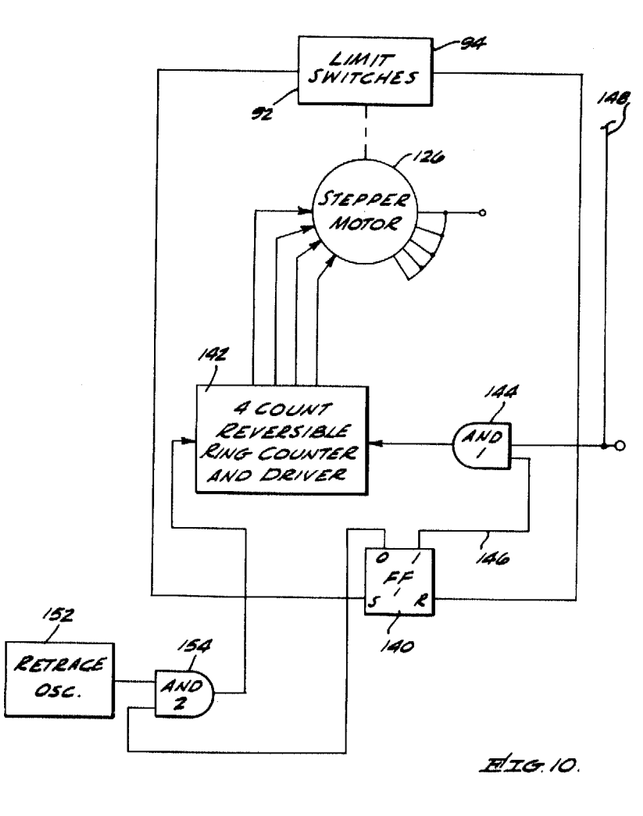
FIG. 10 is a schematic electrical diagram of a typical control circuit that may be employed in the invention.

FIG. 10 is a block diagram of a simplified electrical circuit that may be used to drive the motor 126. It will be recalled by reference to FIG. 7 that when ram 118 reaches its limit of travel in either direction limit switches 92 or 94 are energized. A flip-flop switch is shown in FIG. 10 at 140. With limit switch 94 closed, the slip-flop switch 140 assumes a first circuit condition to a reversible motor driver 142. The driver 142 is operative, upon receipt of an appropriate signal, to either pulse the stepper motor 126 for 90° of rotation in one direction or reverse the rotation, as hereinafter described, and drive the motor 126 through its full cycle of rotation to achieve arcuate motion of the telescope 54 through its entire designed arc.

The circuit operates in the following manner: a first multiple signal switch 144 communicates with reversible driver 142. To pulse the driver 142 in a stepping direction the switch 144 must receive a signal from flip-flop 140 via line 146 and from line 148 which is pulsed in response to the rotational position of the spacecraft. Thus, with the flip-flop switch 140 in the proper position, each time the spacecraft rotates a multiple signal is received as switch 144 from lines 146 and 148 and the driver 142 pulses the motor 126 for a 90° increment of rotation. Thus, in response to satellite rotation, the motor 126 sequentially and periodically steps through an entire range of stepped rotations inducing stepped pivotal motion of the telescope 54 as described. As the telescope 54 moves through its full viewing arc limit switch 92 is closed and flip-flop 140 reversed. A retrace oscillator 152 electrically communicates with multiple pulse switch 154 which communicates with the reverse input of driver 142. Thus, as flip-flop 140 reverses itself and sends a pulse to switch 154, the retrace oscillator energizes reversible driver 142 and the motor 126 is continuously rotated reversing the direction of arcuate movement of telescope 54 until such time as the limit switch 94 is closed. Closure of the other limit switch eliminates the oscillator 152 from the circuit and stepping motor 126 may be again pulsed as above described by the sequential stepping action of the telescope 54.

The invention as disclosed is by way of illustration and not limitation and may be modified in many respects within the scope and spirit thereof.

What is claimed is:

1. In a spin-stabilized satellite positioned in a synchronous orbit whereby the satellite remains in a relatively stationary relationship over an area to be scanned on a terrestrial body, optical means positioned in said satellite and spinning therewith to scan said area, said optical means movable about an axis perpendicular to the spin axis of the satellite, means to induce movement of said optical means in discrete increments keyed to the spin rate of the satellite, and sensing means to receive physical data from the scanned area, said sensing means in an operative arrangement with said optical means.

* * * * *